(12) United States Patent
Schiefelbein

(10) Patent No.: US 8,776,192 B2
(45) Date of Patent: Jul. 8, 2014

(54) METHODS, SYSTEMS, AND COMPUTER PROGRAM PRODUCTS FOR AUTOMATICALLY VERIFYING AND POPULATING DIGITAL CERTIFICATES IN AN ENCRYPTION KEYSTORE

(75) Inventor: Andrew Schiefelbein, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 530 days.

(21) Appl. No.: 12/619,899

(22) Filed: Nov. 17, 2009

(65) Prior Publication Data

US 2011/0116637 A1 May 19, 2011

(51) Int. Cl.
*H04L 29/06* (2006.01)
*H04L 9/32* (2006.01)
*G06F 7/04* (2006.01)
*G06F 15/16* (2006.01)

(52) U.S. Cl.
CPC ................ *H04L 63/0823* (2013.01); *H04L 9/3268* (2013.01)
USPC ................ 726/6; 713/155; 713/157; 713/158

(58) Field of Classification Search
CPC ... H04L 63/06; H04L 63/0823; H04L 9/3268; H04L 9/3273
See application file for complete search history.

(56) References Cited

U.S. PATENT DOCUMENTS

2005/0076204 A1* 4/2005 Thornton et al. ............. 713/156
2005/0149442 A1* 7/2005 Adams et al. .................. 705/51
2006/0236096 A1* 10/2006 Pelton et al. .................. 713/155
2007/0124807 A1* 5/2007 Jau .................................... 726/6
2008/0086634 A1* 4/2008 Salowey et al. .............. 713/156

OTHER PUBLICATIONS

WebSphere Application Server—Express, Version 6.1—Certificate expiration monitoring [online], Sep. 17, 2009 [retrieved on Sep. 24, 2009]. Retrieved from the Internet: <URL:http://publib.boulder.ibm.com/infocenter/wasinfo/v6r1/index.jsp?topic=/com.ibm.websphere.express.doc/info/exp/ae/csec_sslcertmonitoring.html> (2 pages).
Monitoring for certificate expiration [online], Apr. 25, 2009 [retrieved on Sep. 24, 2009]. Retrieved from the Internet: <URL: http://sial.org/howto/openssl/check-expire/> (5 pages).
Hellen, Ian. Certificate Authority Monitor [online], [retrieved on Sep. 24, 2009]. Retrieved from the Internet: <URL:http://www.microsoft.com/technet/scriptcenter/solutions/camon.mspx> (14 pages).

(Continued)

*Primary Examiner* — Cordelia Zecher
*Assistant Examiner* — Trang Doan
(74) *Attorney, Agent, or Firm* — Myers Bigel Sibley & Sajovec PA

(57) ABSTRACT

Methods for automatically verifying and populating an encryption keystore are provided. Pursuant to these methods, the keystore may be automatically checked to determine if it is missing a required digital certificate; if so, the missing required digital certificate may be automatically inserted into the keystore. The methods may also include automatically obtaining the required digital certificates and a list of the required digital certificates, and automatically comparing the list of required digital certificates with the digital certificates in the keystore to determine if the keystore is missing a required digital certificate. The methods may further include sending an informational alert if a missing required digital certificate was automatically inserted into the keystore, and may include checking the keystore to determine if any required digital certificates have expired, will expire within a predetermined time period, or are inoperative. Related keystore verification and population systems and computer program products are also provided.

15 Claims, 4 Drawing Sheets

(56) References Cited

OTHER PUBLICATIONS

Encryption Management Products: Venafi; "Venafi Systems Management for Encryption," Website: www.venafi.com/Products (accessed Oct. 9, 2008). (Admitted Prior Art).

Encryption Management Products: Venafi; "Venafi Client Encryption Manager™," Website: www.venafi.com/Products (accessed Oct. 9, 2008). (Admitted Prior Art).

Technical Bulletin: Venafi™ Server Encryption Manager, www.venafi.com, © 2007.

Technical Bulletin: Venafi™ Systems Management for Encryption™, IBM® WebSphere® MQ Management, www.venafi.com, © 2008.

Technical Bulletin: IBM® WebSphere® MQ Management, Venafi™ Systems Management for Encryption™, www.venafi.com, © 2008.

Technical Bulletin: WebSphere MQ Security Management, Presented to NY/NJ WMQ Users Group, Jun. 4, 2008.

Technical Bulletin: Venafi™ Server Encryption Manager, Feature Brief: IBM® PKI Services for z/0S®, www.venafi.com, © 2008.

\* cited by examiner

| Public Key 25 | Identification Information 26 | Digital Signature 27 | Expiration Date 28 |

METHODS, SYSTEMS, AND COMPUTER PROGRAM PRODUCTS FOR AUTOMATICALLY VERIFYING AND POPULATING DIGITAL CERTIFICATES IN AN ENCRYPTION KEYSTORE

BACKGROUND

This disclosure relates to encryption and, more particularly, to methods and computer program products for maintaining encryption keystores, and encryption keystore maintaining systems that implement such methods and/or computer program products.

Communications transmitted over the internet or other public and private networks may be susceptible to tampering, message forgery, eavesdropping and the like. Confidential information—e.g., financial information such as credit card numbers, bank account numbers, and passwords; personally-identifying information such as social security numbers; and competitively-sensitive business information—is routinely transmitted via the internet and/or other public or private network where it may be intercepted or otherwise compromised. In order to reduce or prevent the theft of such confidential information, a number of encryption protocols have been developed for allowing two computing devices to establish a secure, encrypted link over the internet and/or other networks. One common protocol is the Secure Socket Layer (SSL) protocol and its updated successor, the Transport Layer Security (TLS) protocol (hereinafter, the SSL and TLS protocols and variants thereof will generically be referred to as "the SSL protocol" or "SSL" for ease of description). These protocols can be used (1) to authenticate one or both of the parties to the communication (i.e., ensuring that the computing device on the other end of the connection is in fact who it claims to be) and (2) to provide a secure, private communications link between the two computing devices that is not readily compromised.

The SSL protocol uses a two key cryptographic system to encrypt data. The first key is a public key which may be provided to anyone and which is used to encrypt a message; the second key is a secret, private key, known only to the recipient of the message, that is used to decrypt the message. Many web browsers (e.g., Microsoft Internet Explorer, Mozilla Firefox, etc.) support SSL, as do many, if not most, websites operated by commercial and government entities collecting confidential information over the Internet.

The SSL protocol may be used to establish a secure communications connection over which data can be sent through a network between two computing devices, most typically between a web browser on a client computer and a server associated with a website. Typically, with such communications, the client authenticates the server to verify the identity of the server, but the server does not authenticate the client. This is referred to as "single-sided authentication." In other instances, however, "mutual authentication" may be performed where both the server and the client authenticate the other to verify the other's identity. Mutual authentication is also routinely used when two server computers communicate with each other.

To set up a secure SSL communications link using single-sided authentication as referenced above, the server will typically send a file known as a digital certificate to the web browser on the client computer. The digital certificate includes an embedded public key and the identity of the holder of the digital certificate (i.e., the owner or operator of the server). The digital certificate is issued by a trusted third party known as a "Certificate Authority" (CA), which attests that the public key contained in the digital certificate belongs to the holder noted in the digital certificate. Recognized Certificate Authorities include companies such as Verisign, Entrust, and GlobalSign. The web browser on the client computer will typically contain digital certificates provided by various Certificate Authorities and commonly referred to as "root CA certificates," which are used to decrypt and read digital certificates received from servers (referred to herein as "server digital certificates"). Upon receiving a server digital certificate, the web browser selects the appropriate root CA certificate and uses it to decrypt the received digital certificate to verify that it is valid, and to extract the public key that will be used to set up the secure connection. Unfortunately, however, a number of error conditions can prevent establishment of an SSL link. If these error conditions occur, either the secure connection cannot be set up, or the connection may be possible but the client may have no assurance that the connection is in fact secure, which may cause the client to decline to establish the connection.

SUMMARY

Methods for automatically verifying and populating an encryption keystore are provided. Pursuant to these methods, the keystore may be verified by automatically repeatedly checking to determine if the keystore is missing a required digital certificate. If one or more of the required digital certificates are missing from the keystore, then the keystore may be populated by automatically inserting the missing required digital certificate into the keystore. In some embodiments, these methods may also include automatically obtaining the required digital certificates and a list of the required digital certificates, and automatically comparing the list of required digital certificates with the digital certificates in the keystore to determine if the keystore is missing a required digital certificate. The methods may further include automatically sending an informational alert if a missing required digital certificate was automatically inserted into the keystore.

In some embodiments, these methods can further include automatically repeatedly checking the keystore to determine if any of the required digital certificates have expired and/or are set to expire within a predetermined time period. If so, an appropriate warning alert may be automatically issued. In other embodiments, the methods may further include automatically repeatedly testing a first of the required digital certificates to determine if the first of the required digital certificates operates properly. If one or more of the required digital certificates is found to be inoperable, then a warning alert may be automatically issued. In further embodiments, the methods may also include automatically repeatedly checking to determine if a password for the keystore has expired. If so, an appropriate warning alert may be automatically issued.

Encryption verification and population systems are also provided that may be used to verify and populate an encryption keystore that contains digital certificates. These encryption verification and population systems may include a verifier that is configured to automatically repeatedly check the keystore to determine if the keystore is missing a required digital certificate, and a populator that is configured to automatically insert into the keystore a required digital certificate that is missing from the keystore, in response to the verifier's verifying that the keystore is missing the required digital certificate. In some embodiments, the verifier may be further configured to automatically obtain the required digital certificates and a list of the required digital certificates, and automatically compare the list of required digital certificates with the digital certificates in the keystore to determine if the keystore is missing a required digital certificate. In other embodiments, the verifier may be configured to automatically send an informational alert if a missing required digital certificate was automatically inserted into the keystore.

In further embodiments, the verifier may also be configured to automatically repeatedly check the keystore to determine if any of the digital certificates are expired and/or set to expire within a predetermined time. In still further embodiments, the verifier may also or alternatively be configured to automatically repeatedly check the digital certificates to determine if each of the digital certificates operates properly. The verifier may further be configured to automatically repeatedly check if a password for the keystore has expired. The verifier may automatically issue a warning alert if any of the digital certificates are missing, expired, about to expire, or inoperable, or if the password for the keystore has expired.

Embodiments have been described herein primarily with respect to methods for automatically verifying and populating an encryption keystore. However, analogous computer systems and computer-based methods for automatically verifying and populating an encryption keystore may also be provided according to other embodiments.

Other systems, methods and/or computer program products according to other embodiments will be or become apparent to one with skill in the art upon review of the following drawings and detailed description. It is intended that all such additional systems, methods, and/or computer program products be included within this description and be protected by the accompanying claims.

DETAILED DESCRIPTION

Figures 1, 2:
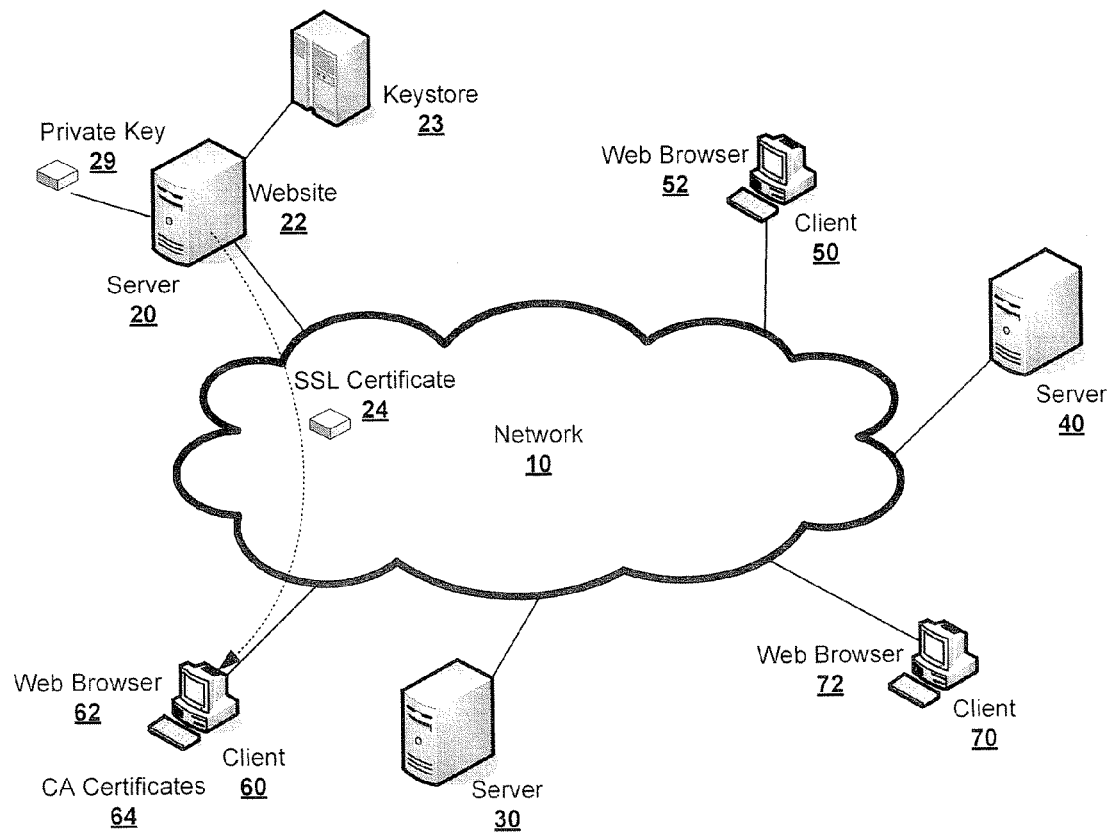
FIG. 1 is a schematic block diagram illustrating an environment in which a client and a server engage in secure communications over a network.
FIG. 2 is a simplified block diagram of an exemplary server digital certificate.

Methods for automatically verifying and populating an encryption keystore, as well as related systems and computer program products, will now be described more fully hereinafter with reference to the accompanying drawings, in which illustrative embodiments are shown. However, it will be appreciated that these methods for automatically verifying and populating an encryption keystore and related systems and computer program products may be embodied in many different forms, and thus the present application should not be construed as limited to the embodiments set forth herein. Rather, these embodiments are provided so that this disclosure will be thorough and complete.

It will be understood that when an element is referred to as being "coupled," "connected," or "responsive" to another element, it can be directly coupled, connected or responsive to the other element or intervening elements may also be present. In contrast, when an element is referred to as being "directly coupled," "directly connected," or "directly responsive" to another element, there are no intervening elements present. Like numbers refer to like elements throughout. As used herein the term "and/or" includes any and all combinations of one or more of the associated listed items. As used herein, an action described as occurring "automatically" means that the action occurs in a manner essentially independent of external control.

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art in light of the present disclosure, and will not be interpreted in an idealized or overly formal sense unless expressly so defined herein.

The present disclosure includes block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. The computer program discussed in such embodiments comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems.

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Likewise, the functionality of one or more blocks of either the flowcharts or the block diagrams may be separated and/or combined with that of other blocks.

Methods, systems and computer program products are disclosed herein that may be used to ensure that a production server or other computer processing device has all of the digital certificates, including root CA certificates and/or server digital certificates, that it needs to establish secure communications with client computers and/or other computer processing devices (e.g., other servers), and that the digital certificates associated with the server are valid, unexpired, and fully operable. As such, these methods, systems, and computer program products may be used to ensure that the encryption keystores associated with the production server are free from error conditions so that client computers or other devices attempting to establish a secure communications connection with the production server will not receive error messages and refuse to establish a connection with the production server.

FIG. 1 is schematic block diagram of a networked computing environment in which the methods, systems, and computer program products described herein may be used. As shown in FIG. 1, a server 20 is connected to a network 10 such as the internet. A plurality of client computers 50, 60, 70 are likewise connected to network 10, as are other servers 30, 40. In FIG. 1, server 20 may be owned or operated, for example, by a commercial entity such as a financial institution, an online retailer, a service provider (e.g., telephone company, cable television provider, etc.) or the like, or by a governmental entity. A website 22 may be hosted on server 20. The server 20 has an associated encryption keystore 23, which is discussed in more detail below. Client computers 50, 60, 70 may use, for example, web browsers 52, 62, 72 that are resident on the respective client computers 50, 60, 70 to access website 22. Website 22 may request confidential or sensitive information from, for example, the user of the client computer 60, such as, for example, credit card numbers, social security numbers, bank account information, personal information (name, age, address, medical history, etc.) or the like. In order to prevent interception and/or eavesdropping through which this confidential information could be provided to unauthorized parties or otherwise compromised, a secure communication link is established between server 20 and client computer 60. Establishment of this secure communication link involves (1) verifying identity by authenticating one or both of server 20 and client computer 60; and (2) establishing a communication link between server 20 and client computer 60 that is encrypted in at least one direction so that, for example, eavesdroppers cannot read the confidential information that is passed between server 20 and client computer 60.

Establishment of a secure SSL communication link between web browser 62 and server 20 will now be described with reference to FIG. 1. Operations may begin with web browser 62 attempting to access a secured domain within server 20 and/or with server 20 reaching a point where it needs to request confidential information from client computer 60. When this occurs, the server 20 initiates an SSL handshake procedure that is used to authenticate the server (single-sided authentication) and perhaps the client as well (in instances of mutual authentication). During the SSL handshake, the web browser 62 requires authentication information from the server 20, including a digital certificate 24 that is referred to as a server digital certificate 24. The server digital certificate 24 is typically implemented as an encrypted file that resides on the server 20 or which is otherwise accessible by the server 20. The server 20 will have previously received this server digital certificate 24 from a Certificate Authority. As noted above, the web browser 62 will typically incorporate a plurality of root CA certificates 64. A root CA certificate is a file (or information in another form such as information stored in a database, register, etc.) that includes information as to how to decrypt and read a digital certificate 24 so that the public key and other information may be extracted therefrom. Each root CA certificate 64 will correspond to one or more different types of server digital certificates 24. Multiple Root CA certificates are typically necessary to fully decrypt and read a server digital certificate 24. When a server digital certificate 24 is forwarded from the server 20 to the web browser 62, the web browser 62 selects the applicable root CA certificate or certificates 64 and uses it/them to decrypt the server digital certificate 24. Typically, new root CA certificates 64 are distributed to web browsers as part of routine automatic software updates.

FIG. 2 is a simplified block diagram of a server digital certificate 24. As shown in FIG. 2, the server digital certificate 24 includes a public cryptographic key ("public key") 25, identification information (e.g., an organization name, a server name, address, or location information, or the like) 26 as well as a digital signature 27 indicating that the server digital certificate 24 was issued by a particular Certificate Authority and an expiration date field 28 which contains an expiration date for the certificate. Once the public key is extracted from the server digital certificate 24, it may be used by the web browser 62 to encrypt messages that are sent to the server 20. The server 20 has a private key 29 that is associated with the public key and that is generally known only to the server 20. This private key 29 allows the server 20 to decrypt communications that it receives which are encrypted using the public key 25. As noted above, the Certificate Authority is a trusted entity that verifies the identity of an entity requesting the issuance of a server digital certificate. The signature 27 of the Certificate Authority included in the server digital certificate 24 provides an assurance to the web browser 62 that the server digital certificate 24 received by the web browser 62 was in fact sent by the individual or entity identified in the identification information 26 included in the server digital certificate 24, and that this identified entity is a verified, legitimate business, government, or other entity. Thus, by obtaining the server digital certificate 24 from the server 20, the web browser 62 can use a stored root CA certificate 64 to verify the identity of the server 20, and a mechanism is provided for the web browser 62 and server 20 to establish a secure, encrypted communications channel.

Server digital certificates 24 are typically stored by the server 20 in the encryption keystore 23. The server 20 will also store root CA certificates 64 in keystore 23, as the server requires such root CA certificate 64 in instances where mutual authentication is performed. Herein, the term "keystore" is used to refer to any storage mechanism, memory location, register, database, file or the like that is used to store a digital certificate such as a server digital certificate 24 and/or root CA certificate 64. The keystore 23 may comprise a single location, memory block, file or the like, or may be a distributed keystore 23 that is stored in multiple locations, files, etc.

Unfortunately, a server digital certificate 24 may not work properly and/or may fail the authentication procedures for a number of reasons. For example, typically a Certificate Authority will include an expiration date (e.g., one year after issuance) with each server digital certificate 24 that it issues. As a result, someone associated with the entity that owns/ operates the server 20 must be responsible for renewing the server digital certificates 24 each year. If the responsible person leaves the entity or fails to complete this task so that one or more server digital certificates expire, clients that receive an expired server digital certificate 24 will typically receive an error message that indicates that the web browser 62 on the client computer 60 was unable to authenticate the server 20. The entity which owns and/or operates server 20 will not necessarily know, however, that it is sending out expired server digital certificates 24. As a result, some amount of time may pass before the entity realizes that a problem exists, and during that time period, many if not most clients will decline to establish an SSL link with the server 20 due to the lack of proper authentication. This, of course, can result in a significant amount of lost business, customer dissatisfaction, and various other problems.

Another problem that can arise is that a replacement server digital certificate 24 that is invalid for some reason may be placed in the keystore 23 to replace an expiring server digital certificate 24. Such an invalid certificate 24 can go through the certificate creation process without any error conditions being detected, but the certificate 24 then simply fails to work properly when placed into use. A replacement server digital certificate 24 might be invalid, for example, because it was malformed, implemented incorrectly, transferred in the wrong file transfer mode (creating invalid characters), etc. Also, it is not uncommon for entities to store replacement server digital certificates 24 in the wrong location when replacing an expiring server digital certificate 24, or to forget to restart the server 20 or other computing or memory device containing the keystore 23 after replacing one or more server digital certificates 24. Once again, such mistakes will typically result in error messages being displayed on client computers that attempt to establish secure SSL communications with the server 20.

Another problem that can arise is that the keystore 23 associated with server 20 may not have the root CA certificates 64 that are required to decrypt and validate server digital certificates 24 that are received by the server 20. While these root CA certificates 64 are only required by the server 20 for setting up secure communications links that involve mutual authentication, typically some amount of the communications from a commercial or government-operated server will require such mutual authentication. If one or more root CA certificates are missing, located in the wrong place, malformed, or expired, the server 20 typically will not be able to decrypt and validate the server digital certificate 24 that it receives from another server or from a client which it needs to authenticate.

Finally, in many instances, certificate management system (CMS) coding may be employed to code the keystore 23 associated with a server. However, CMS coding may include a password expiration which can be set. If such a password expiration is set, and the password is not changed before the expiration date is reached, then when the system on which the keystore 23 resides is rebooted after being taken down for maintenance or other reasons, the server will not be able to access the keystore 23.

Thus, as set forth above, a variety of errors may occur that prevent successful server digital certificate authentication. When this occurs, the web browser 62 will typically issue an error message which, in many or most instances, will cause the user of web browser 62 to abort establishment of the secure communications link.

Figure 3:
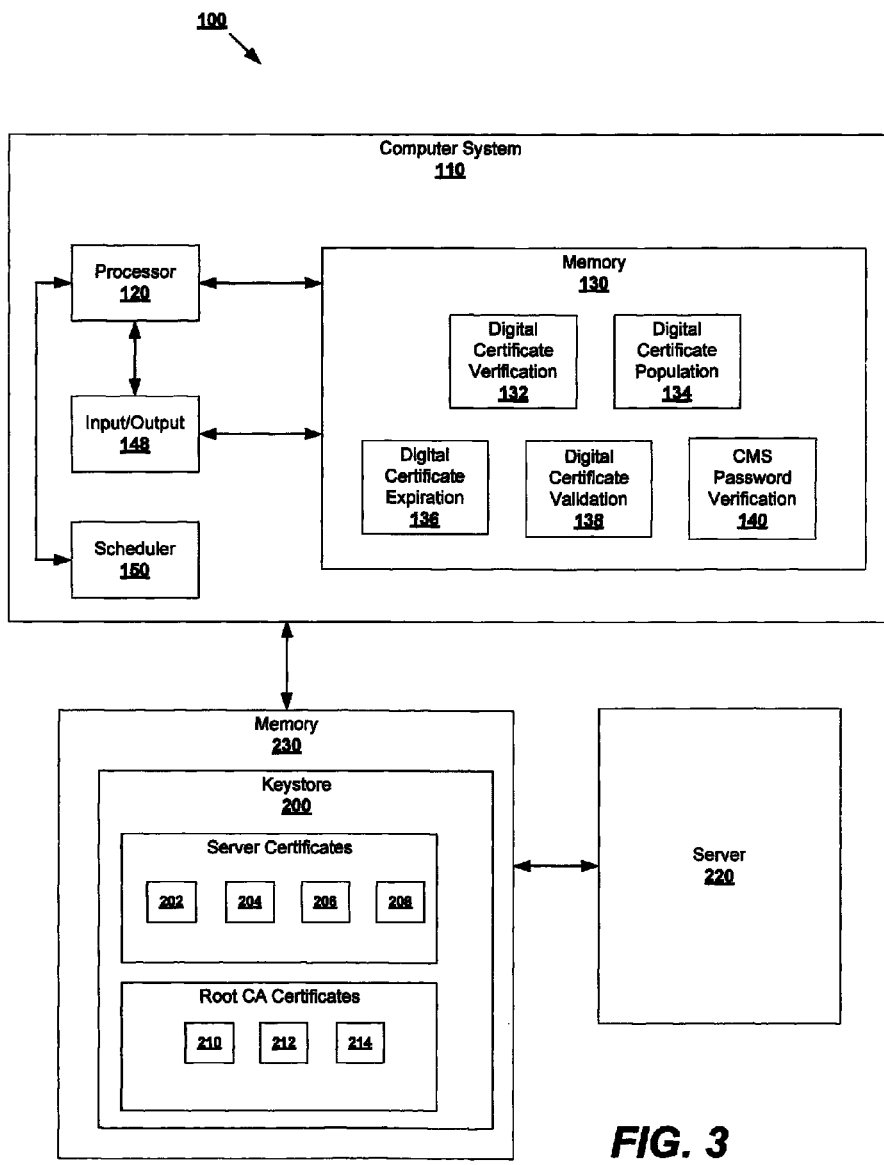
FIG. 3 is a block diagram of an embodiment of an encryption keystore verification and population system.

As noted above, methods, systems, and computer program products are disclosed herein that may be used to ensure that server 20 has all of the server digital certificates 24 and root CA certificates 64 that it needs to establish secure communications with client computer 60, and that the server digital certificates 24 and root CA certificates 64 that are stored in the keystore 23 that is associated with server 20 are valid, unexpired, and fully operable. FIG. 3 is a block diagram of such an encryption keystore verification and population system 100. Herein, the term "encryption keystore verification and population system" is used to refer to a system (which may, for example, be implemented as software running on a computer processing device) that checks one or more items stored in an encryption keystore 23 to verify that the proper digital certificates are in the keystore 23, that inserts any missing required digital certificates into the keystore 23, and that confirms that the digital certificates are working properly, that the digital certificates are not expired or about to expire, and/or that an expired password is not preventing access to the keystore 23.

As shown in FIG. 3, these encryption keystore verification and population systems/computer program products comprise a computer system 110 that includes a processor 120 and a memory 130 that communicates with the processor 120. The processor 120 may be embodied, for example, as one or more enterprise, application, personal, pervasive and/or embedded computer systems and/or special purpose hardware that may be centralized and/or distributed and connected by a wired network and/or a wireless network. The memory 130 may represent an overall hierarchy of memory devices containing software and/or data including, but not limited to, the following types of memory devices: cache, ROM, PROM, EPROM, EEPROM, flash memory, SRAM, DRAM, removable and/or fixed media, as well as virtual storage. The memory 130 may also be centralized and/or distributed and connected by a wired network and/or a wireless network. The memory 130 may be at least partially embedded in processor 120 or may be separate therefrom.

As is also shown in FIG. 3, a digital certificate verification module 132, a digital certificate population module 134, a digital certificate expiration module 136, a digital certificate validation module 138 and a CMS password verification module 140 may be stored in the memory 130. Other software, such as, for example, an operating system, may also be included. It will be further appreciated that the functionality of the modules 132, 134, 136, 138, and 140 may be embodied, at least in part, using discrete hardware components, one or more Application Specific Integrated Circuits (ASIC), and/or a special purpose digital processor. One or more user input/output devices 148 is configured to interact with the processor 120, and may be connected to the computer system 110 directly or via a wired network and/or a wireless network. It will be understood by those having skill in the art that the computer system 110 may include many other components, such as data buses, controllers, operating systems, mass storage systems, etc., that are not illustrated in FIG. 3 for ease of explanation. Modules 132, 136, 138, 140, and each possible subset thereof, may each comprise a "verifier" that is used to automatically verify that the proper items are in a keystore, that the items are working properly, that the items are not expired or about to expire, and/or that an expired password is not preventing access to the keystore. Module 134 may comprise a "populator" that is used to automatically insert into the keystore any required digital certificates that are missing from the keystore.

As noted above, and as shown in FIG. 3, the encryption verification and population system 100 is used to check on and/or verify or validate items that are stored in a keystore 200, and, if necessary, to populate the keystore 200 by automatically inserting into the keystore 200 any required digital certificates that are missing from the keystore 200. The keystore 200 is associated with a server 220. Typically, the keystore 200 will be stored in a memory device 230 that is associated with, and/or part of, the server 220, although it will be appreciated that the keystore 200 can be located elsewhere, can be distributed and/or can be stored in something other than memory (i.e., in registers). In some embodiments, the keystore 200 and the memory 130 of the encryption keystore verification and population system 100 may be part of the same memory. The keystore 200 may include a plurality of server digital certificates 202, 204, 206, 208. Multiple server digital certificates 202, 204, 206, 208 are provided because (1) there are multiple Certificate Authorities, each of which issue their own digital certificates, (2) Certificate Authorities typically issue more than one type of digital certificate and (3) a particular server digital certificate may have to be "chained" using multiple root CA certificates to complete the authentication/decryption process. A commercial, governmental, or other entity that runs a server that engages in secure communications will typically specify in advance the different digital certificates that are to be stored in a given keystore based on the types of activities the server or other computer processing device associated with the keystore is engaged in. The keystore 200 likewise includes a plurality of root CA certificates 210, 212, 214. Once again, the root CA certificates 210, 212, 214 stored in keystore 200 will typically be specified in advance by the entity that operates server 220 (or on whose behalf server 220 is operated).

In some embodiments, the encryption keystore verification and population system 100 may be implemented as software that is stored in the memory 130, although the encryption keystore verification and population system 100 may be stored in other locations. As noted above, this software may comprise one or more of the following functional blocks: a digital certificate verification module 132, a digital certificate population module 134, a digital certificate expiration module 136, a digital certificate validation module 138 and a CMS password verification module 140. The modules 132, 134, 136, 138, 140 may be used to ensure that the keystore 200 includes various necessary items, verify that those items operate properly and are not expired (or about to expire), and, if necessary, to insert into the keystore 200 any required digital certificates that are missing from the keystore 200. These modules are referred to as "functional blocks" to make clear that the encryption keystore verification and population system 100 may include software and/or hardware that carries out the specific functions of at least some of these blocks, regardless of whether or not the software/hardware comprises, for example, a composite unit or a plurality of discrete units that correspond to each module.

The digital certificate verification module 132 is used to automatically verify that the keystore 200 includes each required digital certificate. As discussed above, typically a variety of different digital certificates 202, 204, 206, 208 will be stored in the keystore 200. These digital certificates 202, 204, 206, 208 typically (although not always) expire a year after they are issued, and hence must be repeatedly replaced. Typically, the Certificate Authority that issued the digital certificate will send a notice to an entity a few months in advance of the expiration date listed in expiration date field 28 of the digital certificate (see FIG. 2). However, failure to replace the digital certificate before it expires, or to place the proper digital certificate in the proper location, may result in the keystore 200 not having an unexpired version of each required digital certificate. Client computers attempting to establish a secure communications link to the server 220 that receive an expired digital certificate will generate an error message indicating to the user of the client computer that the client computer was unable to authenticate the server 220 and/or establish a secure connection. To prevent this error condition from occurring, digital certificate verification module 132 is used to automatically repeatedly (e.g., once a week) compare the digital certificates stored in keystore 200 to a predetermined list of required digital certificates that is obtained by or otherwise available to digital certificate verification module 132. If any of the required digital certificates are missing, then digital certificate population module 134 inserts into keystore 200 the required digital certificates that digital certificate verification module 132 has identified as missing from keystore 200. Digital certificate verification module 132 then generates an informational alert that notifies an operator (e.g., by e-mail) that a required digital certificate was missing from keystore 200, but was added to keystore 200 by digital certificate population module 134.

The digital certificate expiration module 136 repeatedly checks to make sure that none of the digital certificates have expired. The digital certificate expiration module 136 may accomplish this, for example, by scanning an expiration date field of each digital certificate stored in the keystore 200. If an expired digital certificate is identified, digital certificate expiration module 134 generates a warning alert that notifies an operator that the identified digital certificate has expired. This alert may comprise, for example, an e-mail alert. In some embodiments, the digital certificate expiration module 136 may also generate a warning alert any time a digital certificate in the keystore 200 has an approaching expiration date (e.g., will expire within a month). By identifying digital certificates that are set to soon expire in advance and generating a warning alert at that time, it may be possible to significantly reduce the likelihood that an expired digital certificate will cause an error condition.

The digital certificate validation module 138 repeatedly checks to make sure that each of the digital certificates stored in keystore 200 are valid, operable certificates. Digital certificate validation module 138 may accomplish this by, for example, repeatedly "chaining" each digital certificate stored in the keystore 200. Typically, a digital certificate will have a tiered structure so that two or more root CA certificates are required to decrypt and read the certificate. The digital certificate validation module 138 in essence pulls each digital certificate 202, 204, 206, 208 in turn from the keystore 200 and performs this validation process on the each certificate 202, 204, 206, 208 using, for example, the root CA certificates stored in keystore 200 to confirm that the digital certificate 202, 204, 206, 208 will operate properly and allow for the creation of a secure link. This process is useful because digital certificates may sometimes be issued by a Certificate Authority that are inoperable (or which do not operate properly). By using the digital certificate validation module 138 to repeatedly confirm that the digital certificates stored in keystore 200 operate properly, instances where a malformed or otherwise inoperable digital certificate prohibit a client from being able to authenticate server 220 and/or establish a secure connection to server 220 may be reduced or minimized. If an inoperable digital certificate is identified, digital certificate validation module 138 generates a warning alert that notifies an operator (e.g., by e-mail) that the identified digital certificate is not working properly.

The CMS password verifier module 140 repeatedly checks to make sure that a CMS password on the keystore (if any) has not expired. Many keystores are coded using an application known as a certificate management system (CMS). CMS has a password feature, and this password can be set to expire. If keystore 200 is implemented in CMS and the password is allowed to expire, then the keystore 200 may no longer be accessible. If the CMS password verifier module 140 determines that keystore 200 is implemented in CMS, it repeatedly checks to make sure that any password has not expired and/or is not about to expire. If it is determined that a CMS password has, or is about to, expire, CMS password verifier module 140 generates a warning alert that notifies an operator (e.g., by e-mail) that the CMS password has or is about to expire, as appropriate.

As is further shown in FIG. 3, the encryption keystore verification and population system 100 may also include a scheduler 150. In some embodiments, the scheduler 150 may be used to determine when each of the modules 132, 134, 136, 138, 140 perform their verification/validation operations. Scheduler 150 may be implemented as a custom software program. In other embodiments, a scheduler such as a system scheduler running on, for example, server 220 may be used.

In FIG. 3, encryption keystore verification and population system 100 is shown as being a separate system from server 220, and the memory associated with the server 220. It will be appreciated, however, that in some embodiments processor 120 may comprise a processor of server 220, and memory 130 may comprise, for example, the memory 230 associated with server 220.

Figure 4:
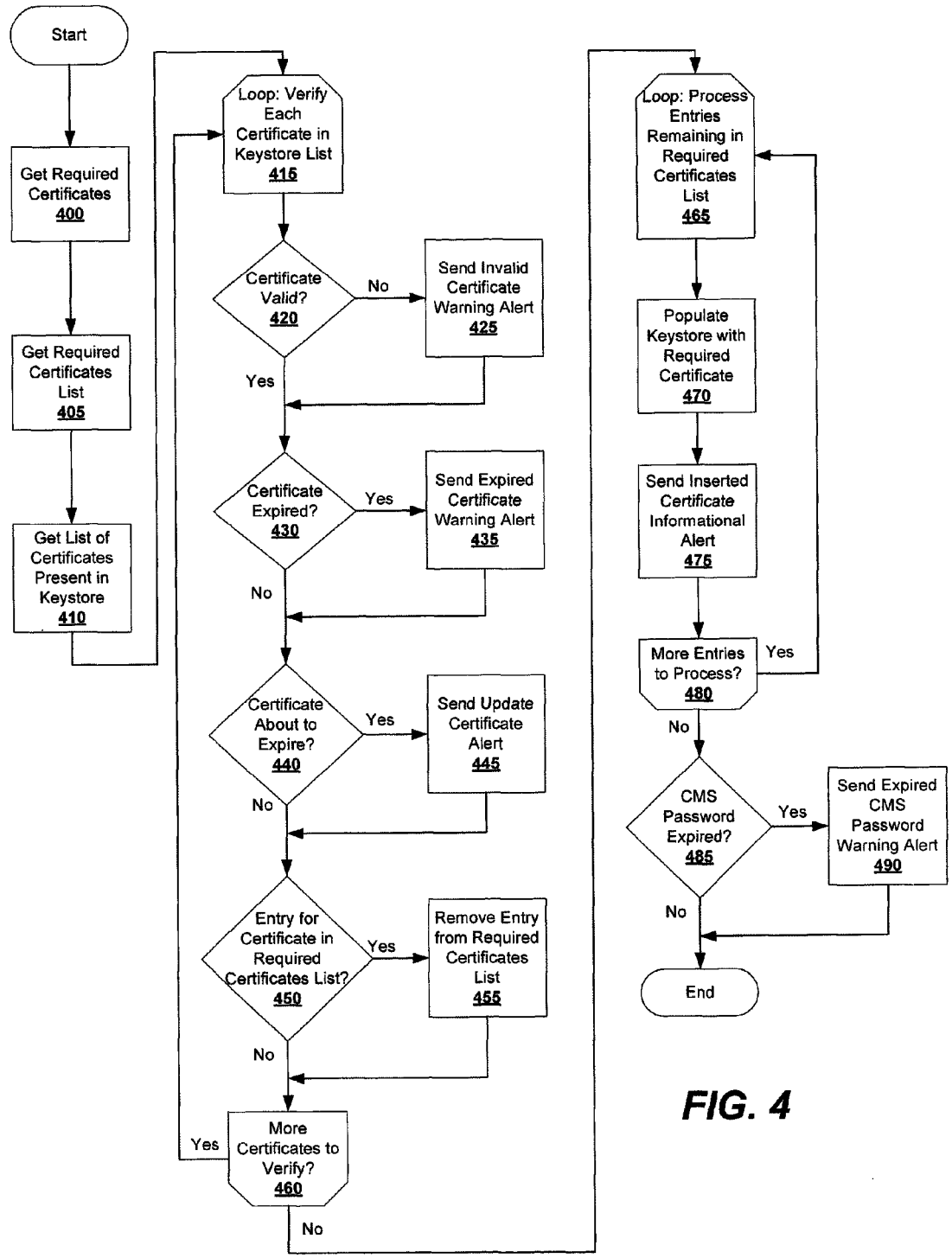
FIG. 4 is a flowchart pursuant to some embodiments for automatically verifying and populating an encryption keystore on a server.

FIG. 4 is a flowchart of operations that may be performed in some embodiments to confirm that all required digital certificates (i.e., root CA certificates and/or server digital certificates) are present within a particular keystore, to insert any missing required digital certificates into the keystore, to verify that the required digital certificates are unexpired and operate properly, and to issue appropriate information and warning alerts if problems or potential problems are identified. As shown in FIG. 4, operations begin at block 400 where the required certificates are obtained. At block 405, a list of the required digital certificates is obtained. A list of digital certificates present in the keystore is obtained at block 410.

A processing loop begins at block 415, in which each certificate in the list of digital certificates present in the keystore is processed as follows. At decision block 420, a determination is made as to whether the digital certificate being processed is valid. If not, an invalid certificate warning alert is sent (block 425). Otherwise, processing continues at decision block 430. At decision block 430, a determination is made regarding whether the digital certificate being processed has expired. If so, an expired certificate warning alert is sent (block 435). If not, processing continues at decision block 440. At decision block 440, a determination is made with respect to whether the digital certificate will expire within a predetermined time period. If so, an update certificates warning alert is sent (block 445). Otherwise, processing continues at decision block 450. At decision block 450, a determination is made as to whether the digital certificate being processed is present in the required certificates list. If so, then the reference to the digital certificate being processed is removed from the required certificates list (block 455). If not, processing continues at block 460. At decision block 460, the processing loop ends. If more digital certificates remain in the list of digital certificates present in the keystore, then the next digital certificate in the list is processed beginning at block 415. Otherwise, processing continues at block 465.

At block 465, a processing loop begins in which each digital certificate remaining in the list of required digital certificates is processed. Recall that, as digital certificates present in the keystore were processed, they were deleted from list of required digital certificates if present. Thus, at block 465, the only entries remaining in the list of required digital certificates are those digital certificates which are required but are missing from the keystore. The keystore is populated with the required digital certificate (block 470). At block 475, an informational alert is sent regarding the insertion of the required digital certificate. The processing loop concludes at block 480. If there are more entries in the list of required digital certificates, then the next entry in the list of required digital certificates is processed beginning at block 465. Otherwise, processing continues at decision block 485.

At decision block 485, a determination is made as to whether the CMS password for the keystore has expired. If so, then an expired CMS password warning alert is sent (block 490). Otherwise, processing concludes.

It will be appreciated that the operations of FIG. 4 may be carried out repeatedly. Herein, the term "repeatedly" is used to indicate that a step or operation is performed from time-to-time. The term "repeatedly" thus is not intended to imply or require that the step or operation be performed at fixed intervals. It will likewise be appreciated that, according to some embodiments, the repeated operations of FIG. 5 may be carried out independent of receipt of an error message or some other indication that the keystore or the contents thereof are not working properly. Thus, for example, the operations of FIG. 5 may be performed repeatedly as part of routine maintenance operations as opposed to being specifically performed because an error message has been received or a problem has been identified. Moreover, pursuant to yet additional embodiments, a frequency at which the operations of the various methods disclosed herein may be increased in response to receipt of an error message.

It will be further appreciated that while in the flow chart of FIG. 4 the operations for checking to determine if a required digital certificate has expired and the operations for checking to determine if a required digital certificate is set to expire within a predetermined time are shown as comprising separate operations, these operations may be performed together in a single step in some embodiments.

Figure 5:
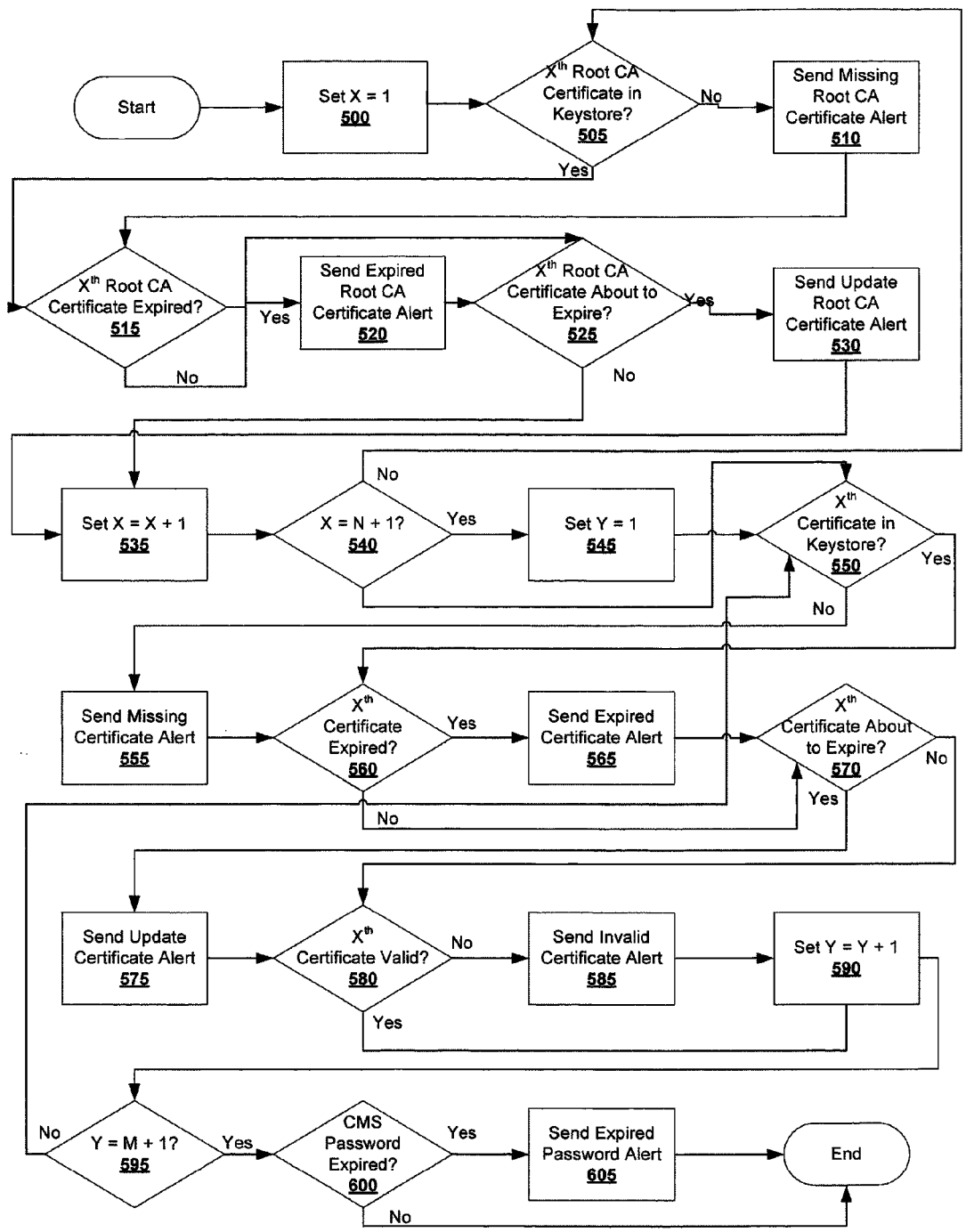
FIG. 5 is a flowchart pursuant to some embodiments for verifying that a server has a valid and operable keystore.

FIG. 5 is a flowchart of operations that may be performed in further embodiments to confirm that all required server digital certificates and root CA certificates are present within a particular keystore, to verify that these server digital certificates and root CA certificates are unexpired and to otherwise validate that the keystore should operate properly, and to issue appropriate alerts if problems or potential problems are identified. In the flowchart of FIG. 5, there are N required root CA certificates that should be stored in the keystore and M required server digital certificates that should be stored in the keystore.

As shown in FIG. 5, operations may begin at block 500 by setting a counter X to have a value of 1. Then the keystore is checked to determine if the first of the N required root CA certificates is stored in the keystore (block 505). If the first of the required root CA certificates is not in the keystore, then a warning alert is issued (block 510), and operations proceed to block 515. If, on the other hand, the first of the required root CA certificates is in the keystore, then operations proceed directly to block 515 without a warning alert. At block 515, a determination is made as to whether the first of the N required root CA certificates has expired. If the expiration date on the first of the required root CA certificates has passed, then a warning alert is issued (block 520), and operations proceed to block 525. If the first of the required root CA certificates has not expired, then operations proceed directly to block 525 without a warning alert. At block 525, a determination is made as to whether the first required root CA certificate is set to expire within a predetermined time (e.g., within one month). If it is, then a warning alert is issued (block 530), and operations proceed to block 535. If the first of the required root CA certificates is not set to expire within the predetermined time, then operations proceed directly to block 535 without a warning alert. At block 535, the counter X is incremented by one. Operations then proceed to block 540, where a determination is made as to whether the current value of X is equal to N+1. If it is not, then operations proceed to block 505, and the operations of blocks 505 to 540 are then repeated until the system has checked to determine if all of the required root CA certificates are in the keystore, and to check whether or not those required root CA certificates have expired and/or are about to expire. It will be appreciated that the operations of blocks 525 and 530 would typically be omitted as unnecessary—even in embodiments that check for upcoming expiration dates—if it is decided at block 515 that a particular root CA certificate has expired.

If, at decision block 540, it is determined that X is equal to N+1, then a second counter Y is set to the value 1 (block 545). Then the keystore is checked to determine if the first of the M required digital certificates is stored in the keystore (block 550). If the first of the required digital certificates is not in the keystore, then a warning alert is issued (block 555), and operations proceed to block 560. If, on the other hand, the first of the required digital certificates is in the keystore, then operations proceed directly to block 560 without a warning alert. At block 560, a determination is made as to whether the first of the M required digital certificates has expired. If the expiration date on the first of the required digital certificates has passed, then a warning alert is issued (block 565), and operations proceed to block 570. If the first of the required digital certificates has not expired, then operations proceed directly to block 570 without a warning alert. At block 570, a determination is made as to whether the first required digital certificate is set to expire within a predetermined time (e.g., within one month). If it is, then a warning alert is issued (block 575), and operations proceed to block 580. If the first of the required digital certificates is not set to expire within the predetermined time, then operations proceed directly to block 580 without a warning alert. It will be appreciated that the operations of blocks 570 and 575 would typically be omitted as unnecessary—even in embodiments that check for upcoming expiration dates—if it is decided at block 550 that a particular digital certificate has expired.

At block 580, a determination is made as to whether or not the first of the required digital certificates operates properly. As discussed above, this may be accomplished by using the root CA certificates that are associated with the digital certificate to "chain the certificate" and thus make sure that the certificate can be decrypted and read. If it is determined at block 580 that the first of the required digital certificates does not operate properly, then a warning alert is issued (block 585), and operations proceed to block 590. If the first of the required digital certificates is found to operate properly, then operations proceed directly to block 590 without a warning alert. At block 590, the counter Y is incremented by one. Operations then proceed to block 595, where a determination is made as to whether the current value of Y is equal to M+1. If it is not, then operations proceed to block 550, and the operations of blocks 550 to 595 are then repeated until the system has checked to determine if all of the required digital certificates are in the keystore and operate properly, and to check whether or not those required digital certificates have expired and/or are about to expire.

If, at decision block 595, it is determined that Y is equal to M+1, then a determination is made as to whether or not any CMS password that is set on the keystore has expired (block 600). If it has, then a warning alert is issued (block 605), and then operations may conclude. If there is no password or it has not expired, then operations also conclude.

It will be appreciated that the operations of FIG. 5 may be carried out repeatedly. Herein, the term "repeatedly" is used to indicate that a step or operation is performed from time-to-time. The term "repeatedly" thus is not intended to imply or require that the step or operation be performed at fixed intervals. It will likewise be appreciated that, according to some embodiments, the repeated operations of FIG. 5 may be carried out independent of receipt of an error message or some other indication that the keystore or the contents thereof are not working properly. Thus, for example, the operations of some or all of blocks 505, 515, 525, 550, 560, 570, 580 and 600 of FIG. 5 may be performed repeatedly as part of routine maintenance operations as opposed to being specifically performed because an error message has been received or a problem has been identified. Moreover, pursuant to yet additional embodiments, a frequency at which the operations of the various methods disclosed herein may be increased in response to receipt of an error message.

It will also be appreciated that while FIG. 5 discloses one particular method, that in other embodiments, various of the operations of FIG. 5 may be omitted. For example, in certain embodiments, only operations 500, 505, 510, 535 and 540 would be performed, and the connectors on FIG. 5 would be modified appropriately. In other embodiments, only operations 500, 505, 510, 515, 520, 535 and 540 would be performed, and the connectors on FIG. 5 would be modified appropriately. In still other embodiments, only operations 500, 505, 510, 525, 530, 535 and 540 would be performed, and the connectors on FIG. 5 would be modified appropriately. Numerous other combinations are readily apparent and hence will not be described further here. It will also be appreciated that a system or computer program product that carries out some or all of the operations of FIG. 5 may also carry out additional operations relating to, for example, ensuring that a keystore operates properly.

It will be appreciated that while in the flow chart of FIG. 5 the operations for checking to determine if a required root CA certificate (or a required server digital certificate) has expired and the operations for checking to determine if a required root CA certificate (or a required server digital certificate) is set to expire within a predetermined time are shown as comprising separate operations, these operations may be performed together in a single step in some embodiments.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of verifying and populating an encryption keystore, comprising:

performing operations as follows on a processor;
verifying the encryption keystore by automatically repeatedly checking the encryption keystore to determine if the encryption keystore is missing a required digital certificate;
wherein verifying the encryption keystore comprises:
automatically obtaining digital certificates present in the encryption keystore and a list of required digital certificates, the list of required digital certificates comprising both root certificate authority certificates and server digital certificates; and
automatically comparing the list of required digital certificates with the digital certificates present in the encryption keystore to determine whether a minimum number of required root certificate authority certificates and a minimum number of required server digital certificates are present in the encryption keystore;
determining that the encryption keystore is missing the required digital certificate;
populating the encryption keystore by automatically inserting into the encryption keystore the required digital certificate that is missing from the encryption keystore;
automatically repeatedly checking the encryption keystore to determine if any of the required digital certificates that are present in the encryption keystore are not operating properly; and
automatically issuing a warning alert when any of the required digital certificates that are present in the encryption keystore are determined to not be operating properly.

2. The method of claim 1, wherein the required digital certificate is one of the root certificate authority certificates and the server digital certificates.

3. The method of claim 1, further comprising automatically issuing an informational alert when one of the required digital certificates is missing from the encryption keystore but is automatically inserted into the encryption keystore.

4. The method of claim 3, further comprising:
automatically repeatedly checking the encryption keystore to determine when any of the required digital certificates that are present in the encryption keystore have expired; and
automatically issuing a warning alert when any of the required digital certificates that are present in the encryption keystore have expired.

5. The method of claim 3, wherein the encryption keystore comprises a certificate management system provider keystore, the method further comprising:
automatically repeatedly checking the certificate management system provider keystore to determine if a password for the certificate management system provider keystore has expired; and
automatically issuing a warning alert when the password for the certificate management system provider keystore has expired.

6. A verification and population system for an encryption keystore that contains a plurality of digital certificates, comprising:
a processor; and
a memory connected to the processor, the memory comprising:
a verifier, when executed by the processor, to automatically repeatedly check the encryption keystore to determine if the encryption keystore is missing a required digital certificate, to automatically obtain digital certificates present in the encryption keystore and a list of required digital certificates, the list of required digital certificates comprising both root certificate authority certificates and server digital certificates, to automatically compare the list of required digital certificates with the digital certificates present in the encryption keystore to determine whether a minimum number of required root certificate authority certificates and a minimum number of required server digital certificates are present in the encryption keystore, to automatically repeatedly check the encryption keystore to determine if any of the required digital certificates that are present in the encryption keystore are not operating properly, and to automatically issue a warning alert when any of the required digital certificates that are present in the encryption keystore are determined to not be operating properly; and
a populator, when executed by the processor, to automatically insert into the encryption keystore the required digital certificate that is missing from the encryption keystore, in response to the verifier verifying that the encryption keystore is missing the required digital certificate.

7. The system of claim 6, wherein the required digital certificate is one of the root certificate authority certificates and the server digital certificates.

8. The system of claim 6, wherein the verifier is further, when executed by the processor, to automatically issue an informational alert when one of the required digital certificates is missing from the encryption keystore but is automatically inserted into the encryption keystore.

9. The system of claim 8, wherein the verifier is further, when executed by the processor, to:
automatically repeatedly check the encryption keystore to determine when any of the required digital certificates that are present in the encryption keystore have expired; and
automatically issue a warning alert when any of the required digital certificates that are present in the encryption keystore have expired.

10. The system of claim 8, wherein the encryption keystore comprises a certificate management system provider keystore; and
wherein the verifier is further, when executed by the processor, to:
automatically repeatedly check the certificate management system provider keystore to determine if a password for the certificate management system provider keystore has expired; and
automatically issue a warning alert when the password for the certificate management system provider keystore has expired.

11. A computer program product for verifying and populating an encryption keystore, the computer readable program product comprising a non-transitory computer readable storage medium having computer readable program code embodied in the medium, the computer readable program code comprising:
computer readable program code to verify the encryption keystore by automatically repeatedly checking the encryption keystore to determine if the encryption keystore is missing a required digital certificate;
computer readable program code to populate the encryption keystore by automatically inserting into the encryption keystore the required digital certificate that is missing from the encryption keystore, in response to a determination that the encryption keystore is missing the required digital certificate;

computer readable program code to automatically obtain digital certificates present in the encryption keystore and a list of required digital certificates, the list of required digital certificates comprising both root certificate authority certificates and server digital certificates;

computer readable program code to automatically compare the list of required digital certificates with the digital certificates present in the encryption keystore to determine whether a minimum number of required root certificate authority certificates and a minimum number of required server digital certificates are present in the encryption keystore;

computer readable program code to automatically repeatedly check the encryption keystore to determine if any of the required digital certificates that are present in the encryption keystore are not operating properly; and computer readable program code to automatically issue a warning alert when any of the required digital certificates that are present in the encryption keystore are determined to not be operating properly.

12. The computer program product of claim 11, wherein the required digital certificate is one of the root certificate authority certificates and the server digital certificates.

13. The computer program product of claim 11, further comprising computer readable program code to automatically issue an informational alert when one of the required digital certificates is missing from the encryption keystore but is automatically inserted into the encryption keystore.

14. The computer program product of claim 11, further comprising:

computer readable program code to automatically repeatedly check the encryption keystore to determine when any of the required digital certificates that are present in the encryption keystore have expired; and computer readable program code to automatically issue a warning alert when any of the required digital certificates that are present in the encryption keystore have expired.

15. The computer program product of claim 13, wherein the encryption keystore comprises a certificate management system provider keystore, and further comprising:

computer readable program code to automatically repeatedly check the certificate management system provider keystore to determine if a password for the certificate management system provider keystore has expired; and computer readable program code to automatically issue a warning alert when the password for the certificate management system provider keystore has expired.

* * * * *